United States Patent
Vitruk

(10) Patent No.: US 6,442,186 B1
(45) Date of Patent: Aug. 27, 2002

(54) STABLE MULTI-FOLD TELESCOPIC LASER RESONATOR

(76) Inventor: Peter Vitruk, 20029 99th Ct. NE, Bothell, WA (US) 98011

(*) Notice: Subject to any disclaimer, the term of this patent is extended or adjusted under 35 U.S.C. 154(b) by 0 days.

(21) Appl. No.: 09/397,433

(22) Filed: Sep. 17, 1999

Related U.S. Application Data

(60) Provisional application No. 60/101,250, filed on Sep. 21, 1998.

(51) Int. Cl.⁷ .................................................. H01S 3/08
(52) U.S. Cl. ............................ 372/95; 372/95; 372/92; 372/66; 372/23; 372/97; 372/90
(58) Field of Search ............................ 372/95, 93, 66, 372/23, 97, 90

(56) References Cited

U.S. PATENT DOCUMENTS

| | | | | |
|---|---|---|---|---|
| 4,653,063 A | * | 3/1987 | Acharekar et al. | 372/107 |
| 4,719,639 A | | 1/1988 | Tulip | |
| 5,353,297 A | | 10/1994 | Koop et al. | |
| 5,418,641 A | * | 5/1995 | Hendow et al. | 359/346 |
| 5,661,746 A | | 8/1997 | Sukhman et al. | |
| 5,822,354 A | * | 10/1998 | Vitruk | 372/92 |
| 5,892,782 A | | 4/1999 | Vitruk et al. | |
| 6,256,332 B1 | * | 7/2001 | Anikitchev | 372/93 |

FOREIGN PATENT DOCUMENTS

DE 19609851 9/1997

OTHER PUBLICATIONS

Gabai, et al. "Radio–frequency excited stripline . . . laser", CLEO '84 symposium, May, 1984, Anaheim, CA.
Siegman–Lasers, University Science Books, Mill Valley, CA 1986 pp. 903–904.
Danilov et al. "Investigation of the misalignment of a resonator . . . laser", Sov. J. Quant. Electron., vol. 6, No. 1, Jan., 1976.
Ananev, "Optical Resonators and problem . . . radiation,", Nauka, 1979, p. 147.

* cited by examiner

Primary Examiner—Paul Ip
Assistant Examiner—Delma R. Flores Ruiz
(74) Attorney, Agent, or Firm—Robert M. Storwick

(57) ABSTRACT

A stable multi-fold telescopic resonator is applied to a slab laser to provide a high power laser beam of a high optical quality. The current invention could be applied to both waveguide and free-space slab lasers with either gas or solid-state active media. A reduced sensitivity to misalignment is achieved through the use of two short-radii concave folding mirrors forming a nearly-confocal or confocal optical resonator. In order to obtain a nearly-symmetrical output beam profile from the large thickness slab lasing medium, the resonator includes a slit diaphragm(s), positioned between the slab and resonator mirrors and aimed to eliminate higher order laser modes in the direction transverse to the plane of the slab. Furthermore, a three mirror multi-fold telescopic resonator is provided by substituting one of the resonator mirrors with a surface of one of the folding mirrors. Also, a four-mirror multi-fold telescopic resonator with the on-axis confocal or near-confocal folding mirror alignment is provided to cover a very large area slab lasing media.

34 Claims, 4 Drawing Sheets

STABLE MULTI-FOLD TELESCOPIC LASER RESONATOR

REFERENCE TO PROVISIONAL APPLICATION

This application claims the benefit of U.S. Provisional Application No. 60/101,250 "STABLE MULTI-FOLD TELESCOPIC LASER RESONATOR", filed Sep. 21, 1998.

TECHNICAL FIELD

Present invention relates to lasers and, more particularly, to a slab laser resonator design of improved beam quality.

BACKGROUND OF THE INVENTION

A slab geometry for an active (either solid-state or gas) lasing medium allows for active medium volume scaling by increasing the area of the slab of constant thickness, which is necessary to provide efficient cooling of the slab by heat conduction.

Diffusion-cooled, slab gas $CO_2$ lasers were first introduced by Gabai, Hertzberg and Yatsiv in Paper TUB4 at CLEO'84, Anaheim, Calif., U.S.A, May 1984. Practical applications of this design are limited since its two-mirror stable resonator does not allow for efficient low order mode selection in the plane of the slab. Additionally, relatively large interelectrode gap (4.5 mm) in this design results in relatively low waveguide losses, leading to insufficient high-order mode discrimination in the transverse direction (perpendicular to the plane of the slab). The slab $CO_2$ laser concept is extended to cover small gap slab resonators in U.S. Pat. No. 4,719,639 to Tulip (the '639 patent). Waveguide losses in the small gap slab laser are significant enough in this design to discriminate against high order transverse modes. Additionally, an off-axis unstable confocal resonator in the '639 patent (see also Siegman, *Lasers*, University Science Books, Mill Valley, Calif., 1986, pp. 903–904) allows for efficient selection of a low order mode in the plane of the slab. However, a disadvantage of an unstable confocal resonator is a non-gaussian output beam profile in the plane of the slab (Hodgson and Weber, *Optical Resonators*, Springer, 1997, p. 507). Another disadvantage is that the output laser beam is of a high-aspect-ratio rectangular shape, which leads to the necessity for using expensive beam reshaping optical devices.

Another prior art slab laser was described in U.S. Pat. No. 5,353,297 to Koop et. al. This slab laser has a folded unstable resonator and, similarly to other unstable confocal resonators, has a disadvantage of a non-gaussian laser beam profile in the plane of the slab. Another disadvantage is that the output laser beam is of a rectangular shape, which leads to the necessity for using expensive beam reshaping optical devices.

Another prior art slab laser was described in U.S. Pat. No. 5,892,782 to Vitruk et. al. This design improves the quality of the laser beam in the direction perpendicular to the plane of the slab in a large gap slab resonator. It is achieved by introducing additional mode discrimination mechanisms—the slab is bent and is of a variable thickness and the electrode surfaces include step-like discontinuities in the middle of the resonator. Disadvantages of this prior art laser include a non-gaussian output beam profile in the plane of the slab as well as a rectangular output laser beam since it utilizes a two-mirror confocal unstable resonator.

A multi-fold stable resonator can be used with a slab shaped active media of either solid-state or gas lasers. A significant advantage of this resonator is the symmetric gaussian shape of the output laser beam. A further advantage of the multi-fold resonator used in $CO_2$ gas lasers is their large resonator length, which helps prevent line-hopping and helps stabilize the output laser power.

A slab laser design with multi-fold resonator was devised in U.S. Pat. No. 5,661,746 to Sukhman et. al. (the '746 patent). This design utilizes a large gap slab design and uses a three-mirror, multi-fold, stable, free-space non-telescopic resonator. The output coupler as well as one of the folding mirrors is flat, while the other mirror is concave. Transverse mode size in this free-space design is defined by the stable mirror configuration and is chosen to be smaller than the slab thickness (interelectrode gap). An unwanted parasitic oscillation between the folding mirrors is eliminated by significant tilt between the folding mirrors. A disadvantage of this design is that the number of passes through the resonator is limited to a very few, which limits the output laser power to about 100 W for practical devices. Since the greater number of passes in this design requires a smaller tilt between the folding mirrors, this causes an unwanted laser oscillation between the two large aperture folding mirrors.

Many disadvantages of the traditional multi-fold resonators can be avoided if an optically unstable folding mirror configuration is used (e.g. a folding mirror resonator axis positioned outside of lasing medium, as in the '746 patent), which eliminates an unwanted laser oscillation between the folding mirrors. Furthermore, if folding mirrors form a telescopic pair, as described by Yu. A. Ananev in "Optical resonators and problem of divergence of the laser radiation" (in Russian 1979, Nauka, Moscow, p. 147, see also O. B. Danilov et. al., "Investigation of the misalignment of a resonator with a telescopic angular selector in a photodissociation laser", Sov. J. Quant. Electr., vol. 6, No. 1, pp. 109–112), then a large width laser beam could cover a large aperture active lasing medium. At the same time, the Fresnel number of such resonator would remain small enough to allow for easy low order free-space mode selection. Such a prior art telescopic laser resonator is presented schematically in FIG. 1A. Laser 10 consists of a large aperture active lasing medium 11, a concave folding mirror 12, a convex folding mirror 13 and two resonator mirrors 14 and 15. An intracavity laser beam 16 covers a large aperture lasing medium, while a large width output beam 17 lowers the power load on the resonator mirror 15, which also acts as an output coupler. FIG. 1B shows schematically a similar multi-fold telescopic resonator, which is applied to large area slab waveguide gas laser in German patent DE 19609851 issued to Anikitchev. Unlike the free-space resonator in FIG. 1A, the active lasing medium 16 in FIG. 1B is slab-shaped and is confined in the gap between the two planar electrodes. Small inter-electrode separation makes this resonator of a hybrid type: it is a waveguide in the direction perpendicular to the plane of the slab and it remains stable free-space in the plane of the slab. Advantages of this resonator include large mode volume and a gaussian beam profile in the plane of the slab as well as efficient lowest order waveguide mode selection in the direction perpendicular to the plane of the slab. A disadvantage of such a resonator is that it is not suitable for larger gap slabs since the waveguide mode selection mechanism in the direction transverse to the plane of the slab is not effective enough to eliminate higher order modes. Consequently, the use of this design is limited to very thin slabs leading to a rectangular output beam shape of high aspect ratio. Additionally, large radius folding mirrors used in German patent DE 19609851 make this resonator very sensitive to the misalignment.

The present invention is aimed to achieve a high quality, nearly-gaussian, symmetrical non-rectangular output laser beam from a multi-fold slab laser resonator with substantially reduced sensitivity to misalignment. A second object of the present invention is to provide a nearly symmetrical output laser beam from a large thickness slab laser with multi-fold telescopic resonator. Another object of the present invention is to improve the beam quality in the direction perpendicular to the plane of the slab of a resonator employing a large thickness slab and for which a waveguide mode selection mechanism is not effective to discriminate against high order modes. Furthermore, it is another object of the present invention to simplify a four-mirror, multi-fold telescopic design. Finally, it is also a object of the current invention to provide for a multi-fold telescopic resonator design suitable for a very large area slab lasing media.

SUMMARY OF THE INVENTION

The slab laser with stable multi-fold telescopic resonator according to present invention consists of a first and second elongated resonator walls having a light reflecting surfaces, a slab of lasing between said elongated walls, a means for exciting the said lasing medium, a first and second folding mirrors and at least one resonator mirror. Folding mirrors are positioned on the opposite ends of the slab and form either confocal or near-confocal unstable pair, between which a laser oscillation is inhibited by the shape and angular alignment of the mirrors. A gaussian output beam profile in the plane of the slab is achieved through a free-space, low Fresnel number, multi-fold stable resonator design in which the folding mirrors provide significantly expanded width of the intracavity laser beam as it propagates through the resonator. An intracavity laser beam is confined between/by the slab boundaries, as it propagates through the slab lasing medium.

A reduced sensitivity to misalignment is achieved through the use of two short-radii concave folding mirrors forming a nearly-confocal or confocal optical resonator of negative branch.

A nearly-symmetrical output beam profile is achieved by using a large thickness slab, so that the width of the beam could be matched to its height, while the resonator includes a slit diaphragm(s) with an aperture slightly smaller than the thickness of the slab. Such a diaphragm is positioned between the slab lasing medium and resonator mirrors and is aimed to substitute the waveguide mode selection mechanism and to eliminate the higher order laser modes in the direction transverse to the plane of the slab. Slit diaphragm could be manufactured as a part of the discharge electrodes of the gas slab laser. Slit diaphragm could be used with either the positive- or negative-branch folding mirror configuration.

Additionally, a three mirror multi-fold telescopic resonator is provided by substituting one of the resonator mirrors with a surface of one of the folding mirrors. Three mirror design is characterized with simplicity of manufacture and alignment and could be used with both the positive- and negative-branch folding mirror configuration.

Finally, a four-mirror multi-fold telescopic resonator is provided to cover a very large area slab lasing media. This design is characterized by the on-axis confocal or near-confocal folding mirror alignment and could be used with both the positive- and negative-branch folding mirror configuration.

DETAILED DESCRIPTION OF THE INVENTION

Figure 1A:
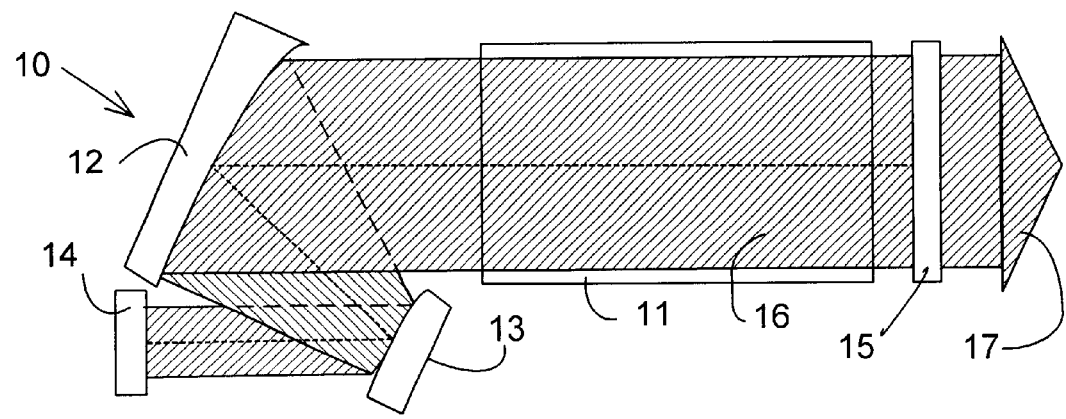
FIG. 1A is a plan-view schematic diagram of a prior art telescopic resonator.
Figure 1B:
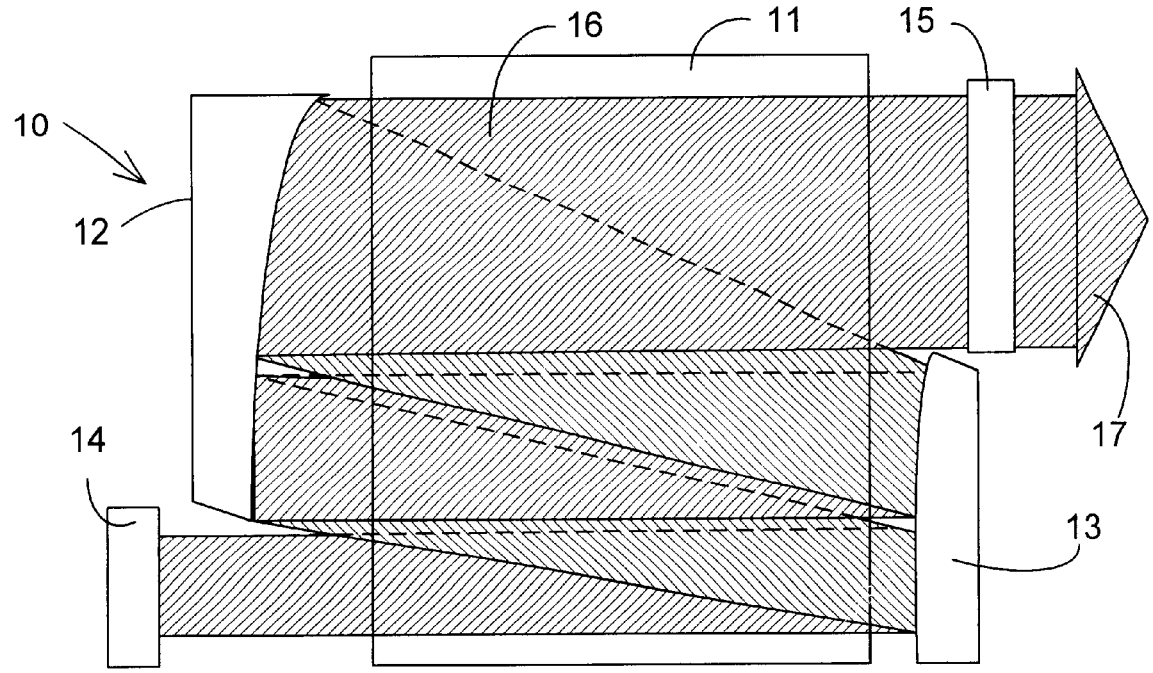
FIG. 1B is a plan-view schematic diagram of a prior art slab multi-fold telescopic resonator.
Figure 2:
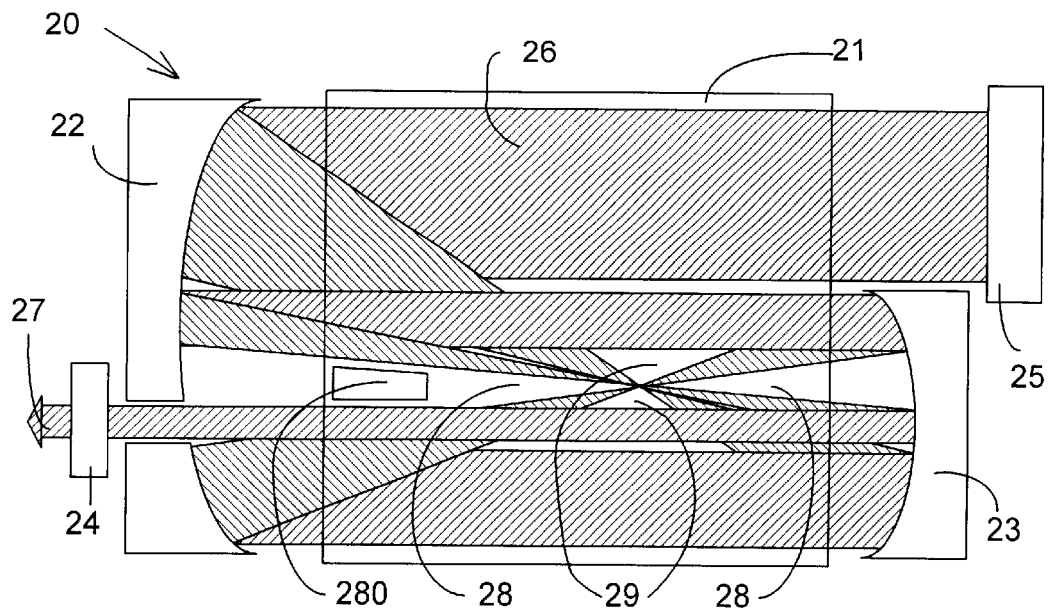
FIG. 2 is a plan-view schematic diagram of a multi-fold telescopic resonator according to present invention.

FIG. 2 is a plan-view schematic diagram of a multi-fold telescopic resonator according to present invention. The laser 20 includes a slab lasing medium 21 confined between two light-reflecting plane boundaries (parallel to the plane of the drawing) of the slab active medium. There are two concave folding mirrors 22 and 23, which are positioned on the opposite ends of the slab lasing medium 21 to form either a confocal or near-confocal, negative branch, unstable optical system. There are also an output coupler 24 and a total reflector 25. An intracavity laser beam 26 is confined in the transverse direction (perpendicular to the plane of the drawing) by the boundaries of the slab (parallel to the plane of the drawing). An intracavity laser beam 26 propagates in the plane of the slab between the total reflector 25 and output coupler 24 along a folded resonator axis. The output coupler 24 and total reflector 25 could be either flat or concave. Preferably, the total reflector 25 and/or output coupler 24 are concave mirrors, making this resonator less sensitive to mirror misalignment and thermal distortions. The output laser beam 27 exits the resonator 20 through the output coupler 24 by passing first through a break in folding mirror 22 (alternatively it could be mirror 23 as well).

An intra-cavity laser beam 26 propagates from total reflector 25 to concave folding mirror 22, then it is focused by the concave folding mirror 22 and undergoes a width reduction in the plane of the slab on its way to the concave folding mirror 23. Then, the folding mirror 23 collimates the beam and sends it to the folding mirror 22. The folding mirror 22 focuses the beam further down while the folding mirror 23 collimates it again, and so on. As the laser beam 26 reaches the output coupler 24, its size is significantly smaller than its original size at total reflector 25. Similarly, as the laser beam propagates from the output coupler 24 back to total reflector 25, its width increases. However, if mirror 24 is made totally reflective and mirror 25 is made partially transparent, then the output laser beam would have a significantly greater width, which might be important for a certain applications of the multi-fold telescopic resonator.

Since this resonator is of a stable free-space type in the plane of the slab 21, the beam profile of its first order mode is gaussian in the plane of the slab 21, which is a very important advantage of the current invention over the prior art unstable confocal resonator. This first order mode can be easily selected by suppressing higher order modes with an appropriately chosen width of mirror holders for output coupler and total reflector. Additionally, since the resonator length for a multi-fold cavity could be very large (compared to the length of the active medium), this resonator is less subject to line hopping (common in $CO_2$ lasers), which leads to greater wavelength, power and mode stability.

Furthermore, since this resonator uses short radii concave folding mirrors, it is characterized by a lower sensitivity to misalignment than the prior art multi-fold telescopic resonator based on the long radii concave-convex folding mirrors.

It is an important task to eliminate the unwanted laser oscillations between the folding mirrors, which is a common problem for multi-fold slab resonators. Unlike prior art patent DE 19609851, the current invention uses the concave folding mirrors which define an unstable resonator with the axis positioned within the lasing medium. Therefore, elimination of the unwanted parasitic oscillation is achieved by the choice of the folding mirror curvatures, R and r, and the distance between the folding mirrors, L. If the magnification factor, $M=|R/r|$ is large enough (i.e. $M>\exp(2gL)$, where g is laser gain coefficient), then this two-mirror resonator will be kept below the lasing threshold. Alternatively, a light absorbing/scattering spacer(s) 280 can be placed within the areas 28 (in FIG. 2), which will help to inhibit the unwanted laser oscillation between the folding mirrors. Furthermore, if placed within areas 29 (in FIG. 2A), such light absorbing/scattering spacers 280 would serve as an intracavity spacial filter to inhibit higher order modes of the telescopic resonator in the plane of the slab 21. If the magnification factor is large enough, then the areas 28–29 not covered by the intracavity laser beam 26 is small relatively to the area of the slab. Additionally, since the output coupling for the multi-fold resonator is significantly greater than for a single-pass resonator of comparable power, then the intra-cavity focal optical density is not greater than in a two mirror unstable resonator of negative branch.

A slab lasing medium could be solid-state, in which case it would be optically excited by the radiation from the source of optical energy like a flash-lamp or laser diodes. Also, the slab lasing medium could be a gas discharge plasma like in the Laser shown in FIG. 3, which is isometric schematic diagram of a multi-fold telescopic resonator according to first embodiment of present invention. The laser resonator 30 in FIG. 3 consists of a slab lasing medium 31 and also folding mirrors 32 and 33, an output coupler 34 and a total reflector 35. A laser beam 37 exits the resonator 30 through an opening 320 in the folding mirror 32 and then through the output coupler 34. Alternatively, if the mirror 34 is made totally reflective and the mirror 35 is made partially transmitting, then the output beam would exit the resonator 30 through the mirror 35 with a significantly greater width, which would be beneficial for a very high power (kiloWatts) laser design. The lasing medium 31 is confined between the electrodes 38 and 39, which are connected to electrical power supply 310. The gas discharge is excited between the electrode surfaces 380 and 390, that also provide cooling for the lasing gas. Additionally, the surfaces 380 and 390 are made light-reflecting so that they confine and waveguide the laser beam 36 in the direction transverse to the plane of the slab 31.

Figure 3:
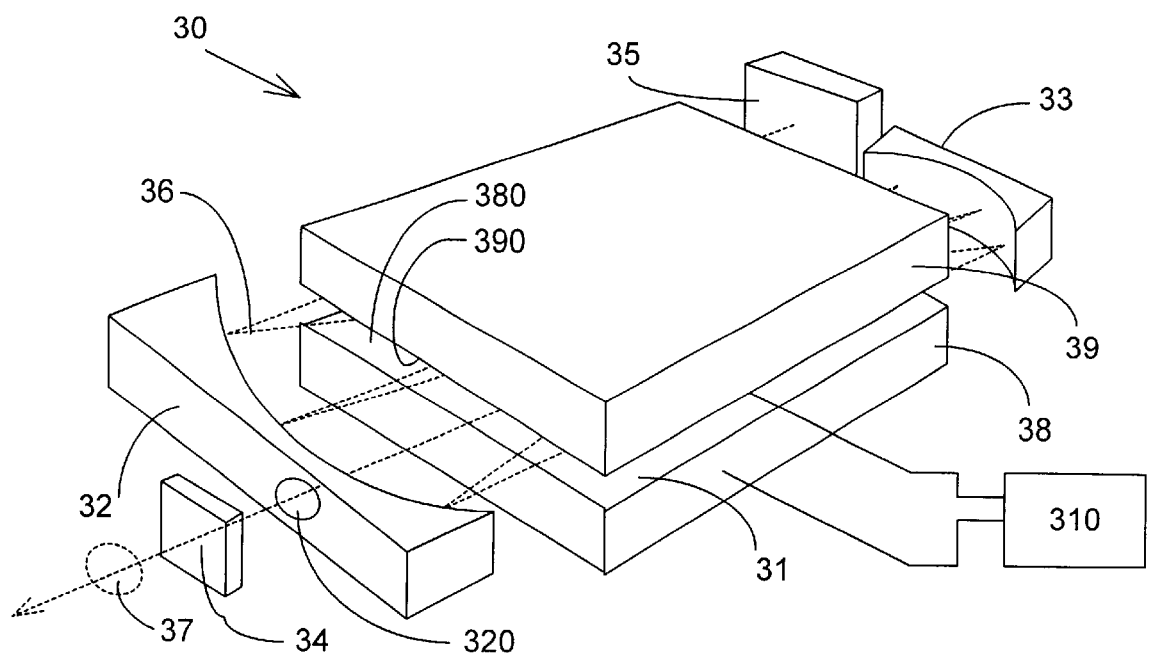
FIG. 3 is an isometric schematic diagram of a multi-fold telescopic resonator according to first embodiment of present invention.

Generally, the output laser beam 37 in FIG. 3 is non-symmetrical since its width is not necessarily the same as its height. A symmetrical output beam shape is possible to achieve if the laser output beam width is chosen to be equal to the lowest order transverse mode size defined by the thickness of the slab. For practical laser devices, such as 200–500 Watts $CO_2$ lasers, the slab thickness needs to be at least 4–5 mm in order to lower the optical power density and avoid optical damage on the output coupler 34. Such large interelectrode distance greatly reduces the waveguide mode selection mechanism, which makes such large gap slabs practically unusable due to a poor quality of laser beam in the direction perpendicular to the plane of the slab.

Figure 4A:
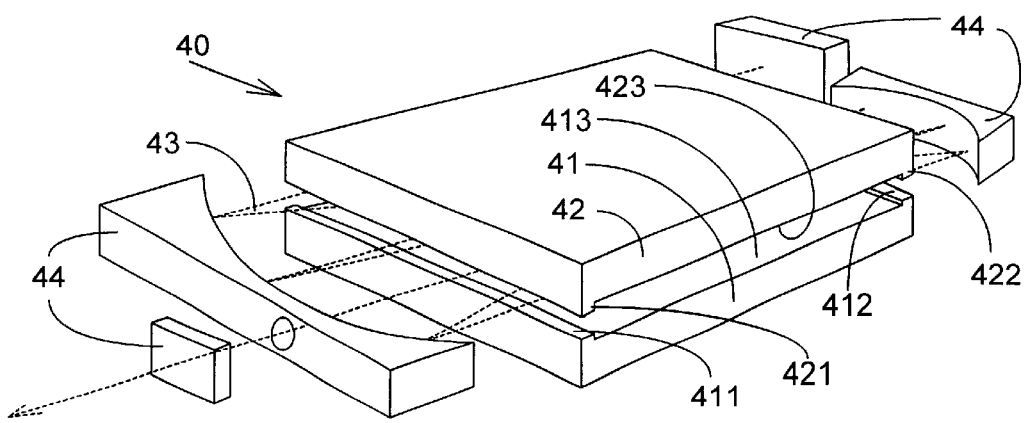
FIG. 4A is an isometric schematic diagram of a multi-fold telescopic resonator and non-planar electrodes according to second embodiment of present invention.
Figure 4B:
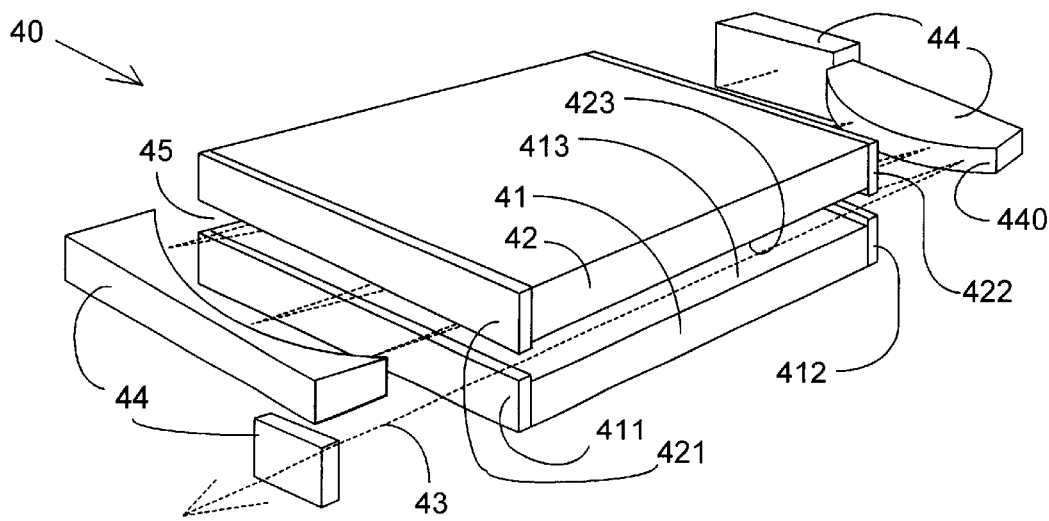
FIG. 4B is an isometric schematic diagram of a multi-fold telescopic resonator and non-planar electrodes according to third embodiment of present invention.
Figure 4C:
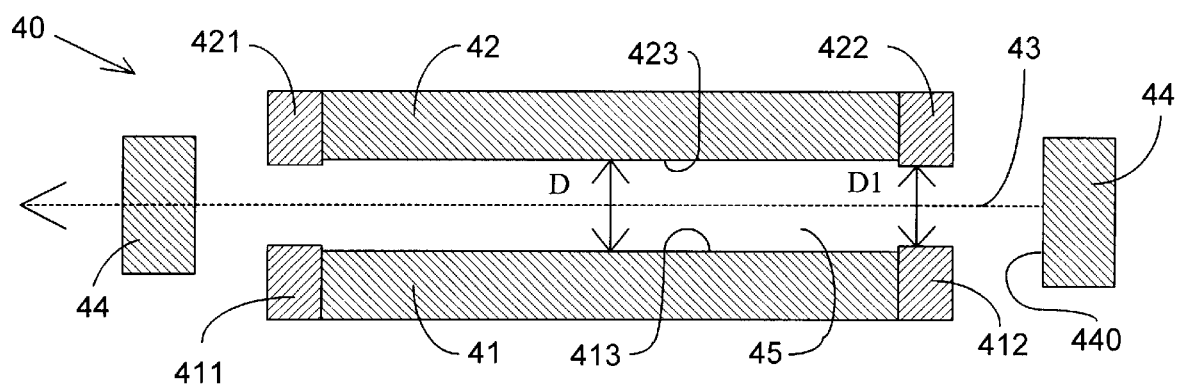
FIG. 4C is a side-view schematic diagram of a multi-fold telescopic resonator and non-planar electrodes according to present invention.

Thus, it is a further object of this invention to provide an efficient laser beam mode selection mechanism in the direction perpendicular to the plane of the slab 31. It is achieved by modifying the shape of the discharge electrode surfaces 380 and 390 through introducing a light absorbing/scattering slit diaphragm at the ends of the electrodes 38 and 39. Alternatively, a separate slit diaphragm(s) is inserted between the slab active medium and mirrors and is intended to introduce mode order dependent resonator losses. Such embodiments of current invention are shown in FIGS. 4A, 4B and 4C. FIG. 4A is an isometric schematic diagram of a multi-fold telescopic resonator and non-planar electrodes according to second embodiment of present invention. FIG. 4B is an isometric schematic diagram of a multi-fold telescopic resonator and non-planar electrodes according to third embodiment of present invention. FIG. 4C is a side-view schematic diagram of a multi-fold telescopic resonator and non-planar electrodes according to present invention. The slab $CO_2$ laser with multi-fold telescopic resonator 40 in FIG. 4A is similar to resonator 30 shown in FIG. 3, though it differs by the addition of laser light absorbing step-discontinuities 411–421 and 412–422 at the ends of the electrodes 41 and 42. Each pair of step discontinuities 411–421 and 412–422 forms a slit diaphragm with aperture $D_1$ being slightly less than slab thickness (or interelectrode gap) D. Alternatively, a slit diaphragms could be formed by the plates 411–421 and 412–422, attached to respective electrodes 41 and 42 as shown in FIGS. 4B and 4C. As the intracavity laser beam 43 in FIGS. 4A, 4B and 4C propagates between the mirrors 44, the slit diaphragms 411–421 and 412–422 obstruct the beam propagation near the electrode walls 413 and 423. Intracavity laser beam losses induced by the diaphragms 411–421 and 412–422 are mode dependent as follows: $k=(4/3)N\pi^2 m^2(D-D_1)^3/D^3$, where m is mode number, N is number of folds, D is interelectrode separation and $D_1$ is aperture of the slit diaphragm. The expression for losses k is derived for the closed cavity resonator eigen-modes, which are shaped approximately as $\sin(m\pi x/D)$, where x is distance across the interelectrode gap. The expression for k is strongly dependent upon $D-D_1$. For example, $k=0.9\%$ $m^2$ for the resonator with N=7, D=4.3 mm, $D_1$=4.1 mm. This results in 3.6%–0.9%=2.7% higher losses for second order mode (m=2) than for fundamental mode (m=1), which is significant enough to favor a fundamental mode oscillation in the resonator.

A transverse mode selector, such as step-discontinuity on the slab boundaries or standalone slit diaphragm, could be used for telescopic resonators with either negative-branch or positive-branch folding mirrors shown in FIG. 4B. For example, first order gaussian output beam width (in the plane of the slab) of 4.3 mm (99% of power) is calculated for 150 Watts, seven-fold, telescopic $CO_2$ slab laser resonator consisting of a flat output coupler, 10 meter concave total reflector, 4.5 meter concave folding mirror and −3.5 meter convex folding mirror. In this case an interelectrode separation is 4.5 mm and a slit diaphragm aperture needs to be approximately 4.3 mm in order to introduce resonator losses 0.9% $m^2$ in the direction perpendicular to the plane of the electrodes, necessary to efficiently discriminate against higher order modes (m>1). Traditional waveguide loss mechanisms do not work efficiently enough in such large gap $CO_2$ slab laser resonators to eliminate high order modes.

According to present invention, there is another laser beam mode selection mechanism in the direction perpendicular to the plane of the slab 45 for resonator 40 with a very large thickness D of the slab 45, see FIGS. 4B and 4C. In this case it is feasible to use at least one cylindrical (curved only in the plane of the slab) folding mirror surface 440, so that the resonator would exhibit a stable free-space properties in the direction perpendicular to the plane of the slab. It is not necessary then for the boundaries of the slab to light-guide (or waveguide) the laser beam as it propagates through the slab. The first order mode would be favored if its size would be substantially smaller than the slab thickness, at the same time the high order modes would be suppressed if their sizes would exceed the thickness of the slab. For example, a calculated 80–100 Watts gaussian beam (98% of power within 6.9 mm diameter) could be achieved from a diffusion-cooled $CO_2$ laser (electrode area is 40 mm by 480 mm, interelectrode separation is 7 mm) with a multi-fold telescopic resonator using a 12 m concave spherical total reflector, a 2.5 m concave output coupler, a 4.5 m concave spherical folding mirror and a −3.5 m convex cylindrical folding mirror (folding mirror separation is 0.5 m).

Figure 5A:
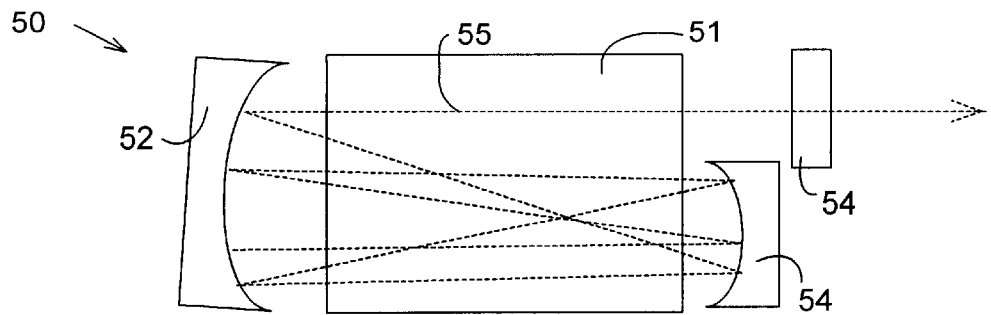
FIG. 5A is a plan-view schematic diagram of a three-mirror multi-fold telescopic resonator with concave folding mirrors.
Figure 5B:
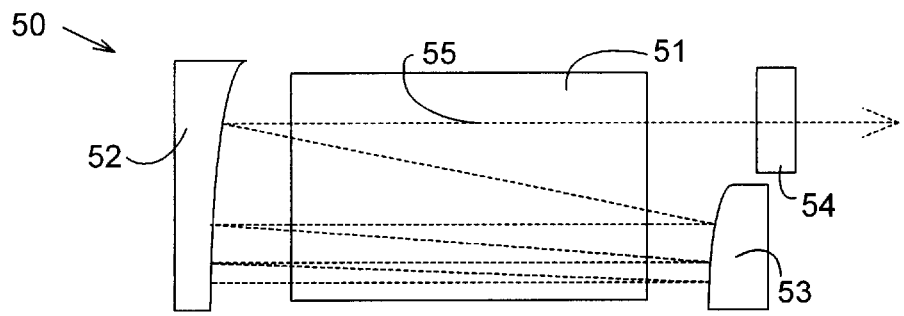
FIG. 5B is a plan-view schematic diagram of a three-mirror multi-fold telescopic resonator with convex and concave folding mirrors.
Figure 5C:
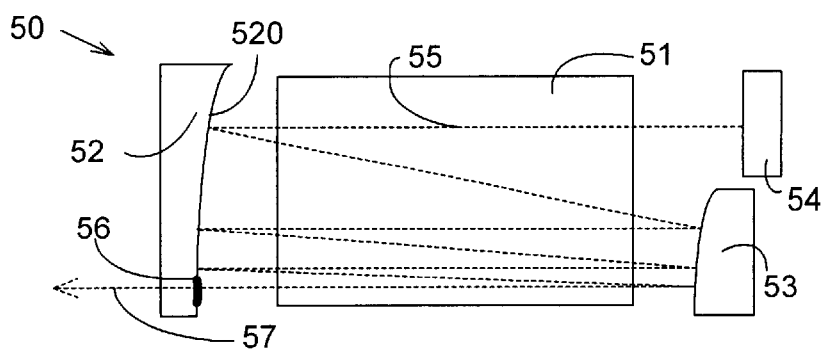
FIG. 5C is a plan-view schematic diagram of a three-mirror multi-fold telescopic resonator with convex and GRM concave folding mirror.

It is another object of current invention to simplify the multi-fold telescopic mirror design, which is achieved through a three-mirror arrangement having two folding mirrors and only one resonator mirror as shown in FIGS. 5A, 5B and 5C. FIG. 5A is a plan-view schematic diagram of a three-mirror multi-fold telescopic resonator with concave folding mirrors. FIG. 5B is a plan-view schematic diagram of a three-mirror multi-fold telescopic resonator with convex and concave folding mirrors. FIG. 5C is a plan-view schematic diagram of a three-mirror multi-fold telescopic resonator with convex and graded reflectivity concave folding mirror. The laser resonator 50 consists of a slab lasing medium 51, folding mirrors 52 and 53 and a resonator mirror 54, which could serve as either an output coupler (FIGS. 5A and 5B) or a total reflector (FIG. 5C). Either negative- (FIG. 5A) or positive-branch (FIGS. 5B and 5C) near-confocal or confocal folding mirror arrangement could be used. A three mirror design is achieved by eliminating one of the resonator mirrors from the four-mirror multi-fold telescopic resonator, so that a portion of the surface of the one of the folding mirrors also serves as an end reflector for this resonator. What makes this configuration to work is the fact that the mirror 52 is not able to efficiently focus/de-focus the laser beam 55 if beam width is small enough and beam diffraction/divergence is very significant. Therefore, mirror 52 works as a telescopic folding mirror for large beam width and it works as just a reflector for significantly smaller beam width when intracavity beam is reflected on itself during its last reflection from mirror 52. Additionally, if the folding mirror 52 in FIG. 5C is made as a graded reflectivity mirror (GRM) having a totally reflecting surface 520 except for the partially transmitting area 56, then a small width output beam 57 would exit through the surface 56.

Figure 6:
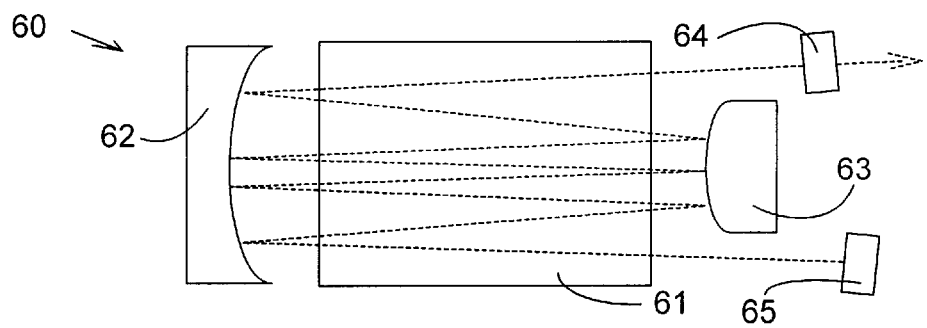
FIG. 6 is a plan-view schematic diagram of a multi-fold telescopic resonator with on-axis aligned folding mirrors.

It is a further object of the current invention to provide for a multi-fold telescopic resonator design suitable for a very large area slab lasing media. It is achieved through a four-mirror multi-fold telescopic resonator with the on-axis alignment of the folding mirrors like shown in FIG. 6, which is a plan-view schematic diagram of a multi-fold telescopic resonator with on-axis aligned folding mirrors. The laser resonator 60 includes the slab lasing medium 61, folding mirrors 62 and 63 and resonator mirrors 64 and 65. This design could be used with both the positive- and negative-branch folding mirror configuration. Unlike the off-axis folding mirrors described above in FIGS. 1–5, the on-axis folding mirror arrangement defines equal and large beam widths at both the resonator mirrors 64 and 65. At the same time the intracavity beam width near the center of the resonator 60 is significantly smaller, which would define a relatively low Fresnel number for this resonator. The on-axis folding mirror based telescopic resonator could cover twice as wide slab medium as the off-axis resonator would with the same parameters of the folding mirrors.

PREFERRED EMBODIMENT

FIG. 4A gives a schematic illustration of a preferred embodiment of the current invention as a 100–150 W, RF excited $CO_2$ gas slab laser with circular and nearly gaussian output beam profile. The electrode area is 55 mm by 480 mm, the interelectrode separation is 5.5 mm, the slit diaphragm aperture is 5.2 mm, the output coupler is flat with 40% transmission at 10.6 $\mu$m and has a 5.5 mm by 5.5 mm clear aperture and the total reflector is flat and has a 5.5 mm by 25 mm clear aperture. Folding mirrors are 0.375 m and 0.625 m concave and are spaced 0.5 m apart. The electrodes are made of aluminum and are water cooled, the gas mixture is $He:CO_2:N_2:Xe=60:15:15:10$ at 60 Torr, the gas is electrically excited by RF current applied to electrodes from RF power source operated at ISM frequency 40.68 MHz.

It should be understood that even though numerous features and advantages of the present invention have been set forth in the foregoing description, the above disclosure is illustrative only. For example, the dimensions given for the various elements are exemplary only and could be modified by those skilled in the art in light of the foregoing discussions. Changes may be made in detail and yet remain within the broad principles of the present invention. Accordingly, the invention is not limited except as by the appended claims.

I claim:

1. A slab laser with a stable multi-fold telescopic resonator, comprising:

first and second elongated resonator walls having light reflecting surfaces with a spacing between the elongated walls, the elongated walls being disposed to form a light guide;

a slab of lasing medium disposed between the elongated resonator walls;

means for exciting said lasing medium; and first and second resonator mirrors and first and second folding mirrors, wherein the first and the second folding mirrors are concave and positioned at opposite ends of said slab to form an unstable near-confocal or confocal system, the first and the second resonator mirrors together with the first and the second folding mirrors forming a stable multi-fold resonator, the resonator together with the spacing of the first and second resonator walls controlling the propagation modes of laser light within the slab laser.

2. The laser of claim 1, wherein the lasing medium is a gas discharge plasma, the means for exciting the lasing medium including a pair of electrodes and an electrical power supply connected to the electrodes, the light reflecting surfaces being discharge surfaces of the electrodes, and the electrodes providing predominant conduction cooling of the gas discharge plasma.

3. The laser of claim 1, wherein the curvature of the first folding mirror is r, the curvature of the second folding mirror is R, and the distance between the folding mirrors is L, the slab of lasing medium having a small signal gain coefficient g so that $|R/r|>\exp(2gL)$ and lasing action between the folding mirrors is inhibited.

4. The laser of claim 1, wherein the light reflecting surfaces are planar.

5. The laser of claim 1, wherein at least one of the folding mirrors is cylindrical and defines the lowest order resonator mode diameter in the direction perpendicular to the first resonator wall, the lowest order resonator mode diameter being substantially less than the spacing between the first and second resonator walls.

6. The laser of claim 1, wherein at least one laser light absorbing/scattering spacer is placed within the resonator to inhibit lasing action between the folding mirrors.

7. The laser of claim 1, wherein the resonator walls are non-planar and further include at least one light absorbing/scattering step discontinuity.

8. The laser of claim 1, wherein at least one of the folding mirrors is a graded reflectivity mirror.

9. A slab laser with a stable multi-fold telescopic resonator, comprising:
  first and second elongated resonator walls having light reflecting surfaces disposed so as to form a light guide, said light reflecting surfaces having a spacing therebetween, said resonator walls also having at least one light absorbing/scattering step discontinuity disposed so as to define at least one slit diaphragm having an aperture, the aperture being smaller than the spacing of light reflecting surfaces;
  a slab of lasing medium disposed between the elongated resonator walls;
  means for exciting the lasing medium; and
  first and second resonator mirrors and first and second folding mirrors,
  wherein the first and second folding mirrors are curved and positioned at opposite ends of the slab to form an optically unstable near-confocal or confocal system, the first and second resonator mirrors and the first and second folding mirrors forming a stable multi-fold resonator that, together with the spacing of the light reflecting surfaces and the aperture of the at least one slit diaphragm, controls the propagation modes of laser light within the slab laser.

10. The laser of claim 9, wherein the lasing medium is a gas discharge plasma, and the means for exciting the lasing medium includes a pair of electrodes and an electrical power supply connected to the electrodes, the elongated light reflecting surfaces being the discharge surfaces of the electrodes, the electrodes providing predominant conduction cooling of the slab of gas discharge plasma.

11. The laser of claim 9, wherein the lasing medium is made of solid-state material, and the means for exciting the lasing medium includes a light source and optical elements to couple optical power from the light source into the slab of lasing medium, the elongated light reflecting surfaces being the surfaces of the slab.

12. The laser of claim 9, wherein the first folding mirror is concave and the second folding mirror is convex.

13. The laser of claim 9, wherein the first and second folding mirrors are concave.

14. The laser of claim 9, wherein the curvature of the first folding mirror is r, the curvature of the second folding mirror is R, and the distance between the folding mirrors is L, the slab of lasing medium having a small signal gain coefficient g so that $|R/r|>\exp(2gL)$ and lasing action between the folding mirrors is inhibited.

15. The laser of claim 9, wherein the light reflecting surfaces are planar.

16. The laser of claim 9, including two slit diaphragms, the two slit diaphragms being used at first and second ends of the slab.

17. The laser of claim 9, wherein at least one of the folding mirrors is cylindrical to define the lowest order resonator mode diameter in the direction perpendicular to the first resonator wall, the lowest order resonator mode diameter being substantially less than the spacing between the first and second resonator walls.

18. The laser of claim 9, wherein at least one of the folding mirrors is a graded reflectivity mirror.

19. A slab laser with a stable multi-fold telescopic resonator, comprising:
  first and second elongated resonator walls having light reflecting surfaces disposed so as to form a light guide, said elongated resonator walls having a spacing between them;
  a slab of lasing medium between the elongated resonator walls;
  means for exciting the said lasing medium; and
  a resonator mirror and first and second folding mirrors,
  wherein the first and the second folding mirrors are curved and positioned at opposite ends of the slab of lasing medium to form an unstable near-confocal or confocal system, the resonator mirror and the first and the second folding mirrors forming a stable multi-fold resonator that, together with the spacing of the first and second resonator walls, controls the propagation modes of laser light within the slab laser.

20. The laser of claim 19, wherein the lasing medium is a gas discharge plasma, the means for exciting the lasing medium includes a pair of electrodes and an electrical power supply connected to the electrodes, the light reflecting surfaces being the discharge surfaces of the electrodes, and the electrodes providing predominant conduction cooling of the gas discharge plasma.

21. The laser of claim 19, wherein the lasing medium is made of solid-state material, and the means for exciting the lasing medium includes the light source and optical elements to couple optical power from the light source into the slab of lasing medium, the elongated light reflecting surfaces being the surfaces of the slab.

22. The laser of claim 19, wherein the curvature of the first folding mirror is r, the curvature of the second folding mirror is R, and the distance between the folding mirrors is L, the slab of lasing medium having a small signal gain coefficient g so that $|R/r|>\exp(2gL)$ and lasing action between the folding mirrors is inhibited.

23. The laser of claim 19, wherein the light reflecting surfaces are planar.

24. The laser of claim 19, wherein the resonator walls are non-planar and further include at least one light absorbing/scattering step discontinuity.

25. The laser of claim 19, wherein the first folding mirror is concave and the second folding mirror is convex.

26. The laser of claim 19, wherein at least one of the folding mirrors is a graded reflectivity mirror.

27. The laser of claim 19, wherein at least one of the folding mirrors is cylindrical to define the lowest order resonator mode diameter in the direction perpendicular to the first resonator wall, the lowest order resonator mode diameter being substantially less than spacing between the first and second resonator walls.

28. A slab laser with a stable multi-fold telescopic resonator, comprising:
   first and second elongated resonator walls having light reflecting surfaces disposed so as to form a light guide and to define a slab of lasing medium therebetween, the elongated resonator walls having a spacing between them;
   a slab of lasing medium disposed between the elongated resonator walls;
   means for exciting the said lasing medium; and
   first and second resonator mirrors and first and second folding mirrors,
   wherein the first and the second folding mirrors are curved and positioned at opposite ends of the slab of lasing medium to form an on-axis unstable near-confocal or confocal system, the system having its optical axis located within the slab, the first and second resonator mirrors and the first and the second folding mirrors forming a stable multi-fold resonator that, together with the spacing of the first and second resonator walls, controls the propagation modes of laser light within the slab laser.

29. The laser of claim 28, wherein the lasing medium is a gas discharge plasma, the means for exciting the lasing medium including a pair of electrodes and an electrical power supply connected to the electrodes, the light reflecting surfaces being the discharge surfaces of the electrodes, the electrodes providing predominant conduction cooling of the gas discharge plasma.

30. The laser of claim 28, wherein the lasing medium is made of solid-state material, and the means for exciting the lasing medium includes the light source and optical elements to couple optical power from the light source into the slab of lasing medium, the elongated light reflecting surfaces being the surfaces of the slab.

31. The laser of claim 28, wherein the curvature of the first folding mirror is r, the curvature of the second folding mirror is R, and the distance between the folding mirrors is L, the slab of lasing medium having a small signal gain coefficient g so that $|R/r|>\exp(2gL)$ and lasing action between the folding mirrors is inhibited.

32. The laser of claim 28, wherein the light reflecting surfaces are planar.

33. The laser of claim 28, wherein the resonator walls are non-planar and further include at least one light absorbing/scattering step discontinuity.

34. The laser of claim 28, wherein the first folding mirror is concave and the second folding mirror is convex.

* * * * *